United States Patent [19]

Christiphine

[11] Patent Number: 5,505,930
[45] Date of Patent: Apr. 9, 1996

[54] METHOD FOR CONVERTING REACTIVE METALS SUCH AS SODIUM INTO A METAL HYDROXIDE

[75] Inventor: Frank B. Christiphine, Baton Rouge, La.

[73] Assignee: Merrick Remediation Company, Inc., Baton Rouge, La.

[21] Appl. No.: 179,434

[22] Filed: Jan. 10, 1994

Related U.S. Application Data

[63] Continuation of Ser. No. 749,200, Aug. 23, 1991, abandoned.

[51] Int. Cl.$^6$ .................................................. C01D 1/00
[52] U.S. Cl. ..................... 423/641; 423/179; 423/180
[58] Field of Search .............................. 423/641, 180, 423/179; 588/261

[56] References Cited

U.S. PATENT DOCUMENTS

| | | |
|---|---|---|
| 2,660,517 | 11/1953 | Padgitt .................... 423/641 |
| 3,490,871 | 1/1970 | Miller et al. .............. 423/641 |
| 3,918,961 | 11/1975 | Maffei et al. ............. 423/180 |
| 4,254,089 | 3/1981 | Levy ....................... 423/641 |

*Primary Examiner*—Steven Bos
*Attorney, Agent, or Firm*—Gilbreth & Adler

[57] ABSTRACT

Disclosed is a method for conversion in a container of reactive material comprising at least one selected from the group consisting of sodium, potassium and lithium into its respective metal hydroxide. First the container is purged of essentially all oxygen with an essentially dry gas that is inert with respect to the reactive material. Next, a carrier gas is introduced into the container that is inert with respect to the reactive material. The humidity of the carrier gas, the temperatures of the reactive material, condensing surfaces inside the container, and the carrier gas are all suitable to allow water to condense out of the carrier gas once the carrier gas contacts the condensing surfaces and the reactive material. The condensed water will then react with the reactive material thereby forming the respective metal hydroxide and hydrogen.

29 Claims, 1 Drawing Sheet

5,505,930

METHOD FOR CONVERTING REACTIVE METALS SUCH AS SODIUM INTO A METAL HYDROXIDE

This is a continuation of application Ser. No. 07/749,200 filed Aug. 23, 1991 now abandoned.

BACKGROUND OF THE INVENTION

1. Field of the Invention

The present invention relates to a method for safely reacting active metals. In another aspect, the present invention relates to a method for safely converting active metals into metal hydroxides. In still another aspect, the present invention relates to a method for the insitu conversion of active metals into metal hydroxides.

2. Description of the Related Art

Active metals such as sodium, potassium, lithium, and calcium are widely used because of their valuable properties.

Both potassium and sodium have been used in commercial processes for the production of aluminum as reducing agents, and both have been utilized as heat transfer medium in chemical or nuclear reactors and other applications.

Potassium is also used in the production of potassium superoxide for life support systems. Potassium also enhances the activity of some catalysts, and has some application in magnetohydrodynamics.

The production of tetraethyllead and tetramethyllead and other antiknock agents for gasoline is one of the largest outlets for sodium. Refractory metals such as titanium, zirconium, and hafnium are manufactured by sodium reduction of their halides. Sodium is employed as a reducing agent in numerous other processes, including the preparation of dyes, herbicides, pharmaceuticals, high molecular weight alcohols, perfume materials, and isosebacic acid. Sodium can even function as a catalyst for many polymerizations, such as the polymerization of 1,2-butadiene (the Buna process) and the copolymerization of styrene-butadiene mixtures (the modified GRS process).

Lithium is also utilized as a component of reducing systems for organic compounds. Lithium has been proposed as a breeding blanket and reactor coolant in magnetic fusion energy facilities.

The widescale industrial use of metals, such as potassium, lithium, sodium and calcium has created the need to dispose of waste containing such metals, and the need to clean equipment or articles of manufacture. Even the transportation of such metals can create problems. For example, in the transportation of sodium, it is poured in liquid form into a railway tankcar. Upon reaching the desired destination the sodium is liquified and drained out of the tankcar, by passing hot oil through a Jacket or coils around the tankcar. Unfortunately, the draining is never complete as some sodium residue is left in the tankcar and builds with each draining. After several such drainings the residue, referred to as a "sodium heel" or "sludge" may build up to and even exceed about 15,000 pounds for a tankcar with an approximate 100,000 pound sodium capacity.

Cleaning, however, is difficult as these metals are quite hazardous because of their high chemical reactivity with water and the danger of explosive reactions. These metals react readily with ambient atmospheric moisture to liberate hydrogen gas and much heat. The reaction of sodium, for example, is sufficiently exothermic to result in ignition or explosion of the hydrogen gas and ignition of the sodium metal. The current state of the art method of cleaning reactive metals from tankcars, tanks and storage containers is to first purge with dry air, and then to manually remove the reactive metal, and then to ship it off to be incinerated. However, this method is very labor intensive and is potentially quite hazardous.

Numerous other prior art methods to dispose of active metals and to clean equipment or articles of manufacture have been proposed.

Such prior art methods include the method of introducing sodium sludge into the lower portion of an upflowing stream of an aqueous sodium hydroxide solution and a method of reacting alkali metals by providing a pool of liquid metal hydroxide within a confined area, introducing an alkali metal feed above the upper surface of the pool, and passing steam through the pool to contact the alkali metal at its surface.

Other disposal methods for alkali metals include ocean dumping which relies on the vast quantities of water to dilute the caustic so formed and the ocean air to quickly dilute the hydrogen concentration to a safe level or forcing molten alkali metal through a nozzle underwater at sufficient velocity to cause the alkali metal to break up into a fine spray which will react instantly with the water.

Alkali metals have also been reacted in a two-layer liquid system with the top layer being a nonreactive liquid and the bottom layer being a reactive liquid, reacted by being sprayed into a disposal solution, or reacted by being sprayed by a solution while floating in metal hydroxide.

Complex multi-step reaction methods have also been proposed comprising dissolving an alkali metal into an inert metal, contacting the melt with a salt containing the alkali metal hydroxide and a gas containing oxygen, which converts the alkali metal to an oxide which is dissolved in the salt. The salt is separated from the melt and contacted with a gas containing water to convert the alkali metal oxide to its hydroxide.

It is even known that equipment may be cleaned by being opened to air and heated until any sodium present is oxidized, or by purging thoroughly with nitrogen, then slowly admitting dry steam to the system while maintaining the nitrogen purge.

However, many of the prior art methods implicity require that the reactive metal first be removed prior to reacting it to a less reactive state or are only practical for lesser amounts of reactive metal than for example, the thousands of pounds of sodium heel that is typically found in a railcar or other containers.

SUMMARY OF THE INVENTION

According to the present invention there is provided a method for conversion in a container of at least one reactive material such as calcium, sodium, potassium or lithium into its respective metal hydroxide. The first step of the method requires purging the container of essentially all oxygen with a dry gas that is inert with respect to the reactive material. Next, a carrier gas is introduced into the container that is inert with respect to the reactive material. The humidity of the carrier gas, the temperatures of the reactive material, condensing surfaces inside the container, and the carrier gas are all suitable to allow water to condense out of the carrier gas once the carrier gas contacts the condensing surfaces and the reactive material. The condensed water and the reactive material then react together, forming the respective metal hydroxide and hydrogen. The metal hydroxide can be pumped from the container, and the hydrogen is slowly purged from the container by a sufficient flow of inert gas such that the lower explosive limit cannot be obtained when the flow enters the air.

DETAILED DESCRIPTION OF THE INVENTION

Figure 1:
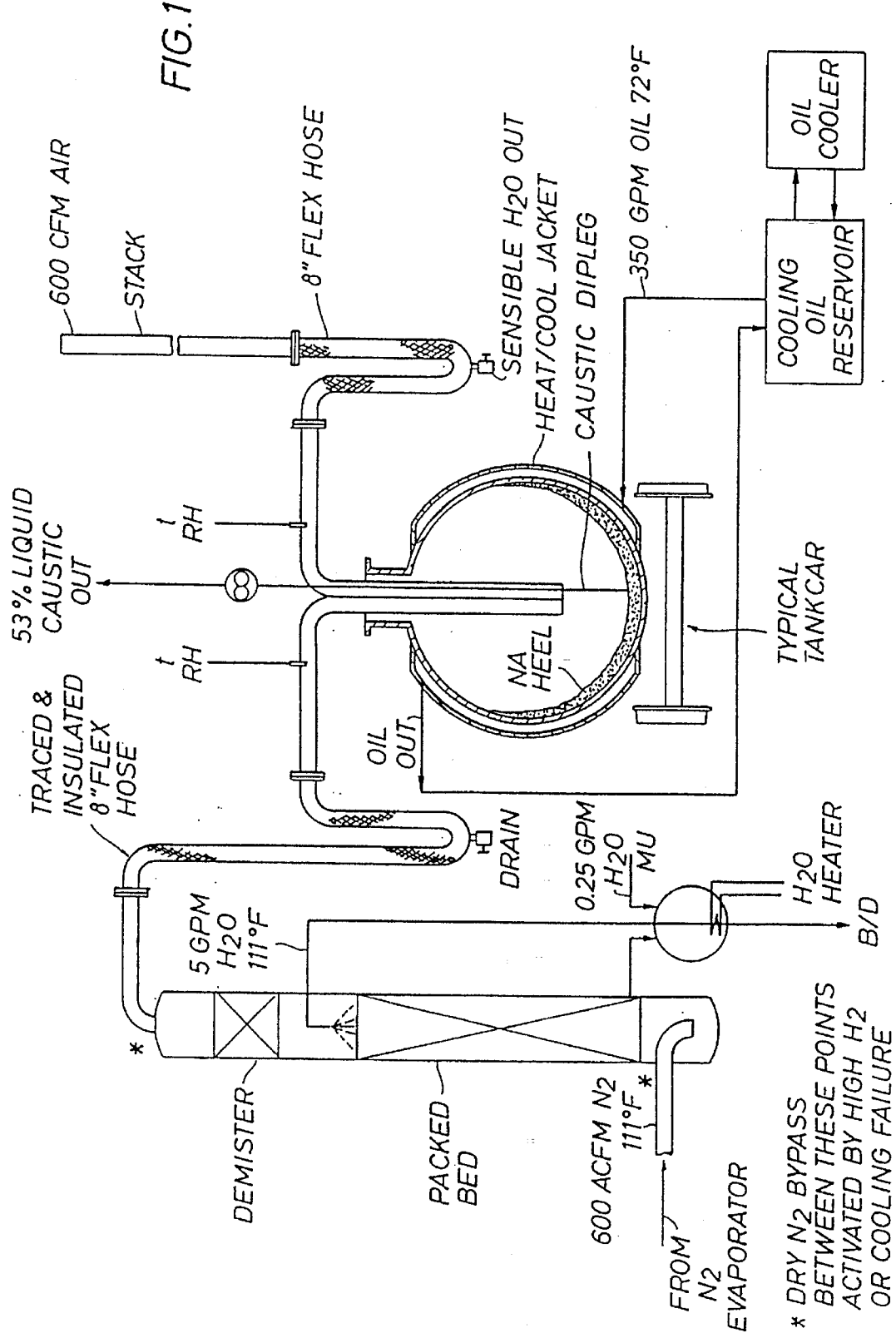
FIG. 1 is a process flow schematic showing a typical arrangement for reacting sodium in a railway tankcar to sodium hydroxide.

Reactive materials to which the present invention may be applied comprise at least one selected from the group consisting of calcium, potassium, sodium and lithium. Preferably the reactive material comprises sodium.

The reactive metal material may be added to the container, or it may already exist insitu.

"Container" as used herein is understood to mean anything in which the reactive material might be contained, including but not limited to, tankcars such as those used for transporting materials by train or truck, tankers such as those used in shipping by sea, reactors, vessels, tanks, drums, barrels, piping, tubes, flasks or equipment.

In order to minimize the potential of explosions the container should be essentially oxygen free. This is generally accomplished by utilizing a purge gas to purge the container of oxygen.

In the method of the present invention the purging is carried out utilizing a dry gas that is inert with respect to the reactive material. Generally any gas may be utilized as the purge gas provided that it is inert with respect to the reactive material for the given operating conditions of the method. Preferably the purge gas comprises at least one selected from the group consisting of nitrogen, neon, argon and helium. Most preferably the purge gas comprises nitrogen.

The purge gas is required to be dry to minimize any reactions during the purging stage. Generally the relative humidity of the dry purge gas is such that reactions are minimized during the purging stage. Generally the relative humidity of the dry purge gas is in the range of about 0 to about 10 percent. Preferably the relative humidity of the dry purge gas is in the range of about 0 percent to about 5 percent. Most preferably, the relative humidity of the dry purge gas is about 0 percent.

Methods of drying a gas are well known to those of skill in the art and the present invention is not limited to any particular method of gas drying.

Once essentially all of the oxygen has been purged from the container, the reactive material may now be reacted with water. Because of the exothermic nature of the reactive materials with water, and the rate at which hydrogen may be generated, water must be added to the reactive material very slowly, generally in a very careful and controlled manner. In the method of the present invention, this is accomplished by adding water to the system in the form of humidity in a carrier gas.

Generally any gas may be utilized as the carrier gas provided that it is inert with respect to the reactive material for the given operating conditions of the method. Preferably the carrier gas comprises at least one selected from the group consisting of nitrogen, neon, argon and helium. Most preferably the carrier gas comprises nitrogen.

With respect to water content, the carrier gas generally has a relative humidity such that the water will condense out upon hitting the cold surface in the container. It is also important to avoid sensible water. Generally, the relative humidity at the temperature at which the gas is introduced into the container is in the range of about 50 percent to saturation. Of course, a drier gas than 50 percent relative humidity may be utilized, as long as water will condense out upon hitting the cold surface. Preferably, the carrier gas has a relative humidity at the temperature in the range of about 80 percent to saturation, and most preferably, the carrier gas is about saturated with water.

Methods of humidifying a gas are well known to those of skill in the art and the present invention is not limited to any particular humidification method. A convenient method of humidifying the carrier gas is by counterflow contact of the gas with water in a packed tower.

The temperature of the reactive material must be maintained such that as the incoming carrier gas contacts the reactive material and condensing surfaces, such as for example container walls, water will condense out of the carrier gas. This requires of course that the temperature of the reactive material and condensing surfaces be lower than the temperature of the carrier gas. The temperature differential between the warmer incoming carrier gas and the cooler reactive material and condensing surfaces is generally in the range of about 5° C. to about 95° C. Preferably the temperature differential is in the range of about 12° C. to about 40° C., most preferably in the range of about 22° C. to about 34° C.

Generally the temperature of the incoming carrier gas is in the range of about 0° C. to about 100° C. Preferably the temperature of the carrier gas is in the range of about 30° C. to about 60° C., most preferably in the range of about 46° C. to about 52° C.

Generally the temperature of the reactive material and condensing surfaces is in the range of about 5° C. to about 95° C. Preferably the temperature is in the range of about .7° C. to about 32° C., most preferably in the range of about 10° C. to about 24° C.

The carrier gas must remain in the container for a sufficient amount of time to allow some water to condense out onto the reactive material. Residence time of the carrier gas in the container is generally in the range of about 0.1 seconds to about 24 hours. Preferably, the residence time is in the range of about 1 minute to about 1 hour, and most preferably in the range of about 1 minute to about 15 minutes.

The desired water condensation rate must be controlled to prevent excess hydrogen buildup and to prevent excess heating. The condensation rate will vary depending on the amount of reactive metal present, the process temperatures, and flow rate of the gas. For example, for a typical 12,000 gallon railway tankcar having a 5,000 pound sodium heel, the water condensation rate is generally in the range of about 0.1 lbs/min to about 20 lbs/min. Preferably, for a typical railway tankcar, the water condensation rate is in the range of about 1 lbs/min to about 10 lbs/min, most preferably in the range of about 2 lbs/min to about 5 lbs/min.

It will generally be necessary to maintain the reactive material and the condensating surfaces at the desired temperature by cooling. This is necessary to prevent localized overheating and to maintain the temperature differential that drives that the condensation. Generally the container will comprise coils or a jacket through which coolant may be passed to cool the container and condensating surfaces. The reactive material is generally cooled by conduction through contact with the container wall. For example, a railway tank car generally comprises a jacket through which a heat transfer medium may be passed.

As the reaction between the condensed water and the reactive material proceeds, hydrogen and the metal hydroxide will be formed. To prevent the metal hydroxide from covering the reactive material and slowing the reaction the metal hydroxide may be pumped from the container and recovered as a useful product.

The exiting carrier gas has been cooled by contact with the cooled reactive material and cooled condensing surfaces. Generally the temperature of the exiting carrier gas should be monitored so the that the rate of condensation can be determined.

The concentration of hydrogen in the exiting carrier gas should be maintained below the explosive limit (in air). The concentration of the hydrogen in the exiting carrier gas is generally in the range of about 0.7 volume percent to about 3.8 volume percent. If the concentration of the hydrogen in the exiting carrier gas is above that desired, it may always be diluted with an air blower or fan.

EXAMPLES

Example 1

In a laboratory trial, nitrogen at 46° C. was saturated with water in a bubbler maintained at 45° C. and introduced into a flask containing 0.45 grams of sodium. Condensation of water on the sodium surface was observed. Tiny bubbles of gas rose from the sodium through the liquid. Exit gas temperature was 18° C.

After 1.5 hours approximately 0.1 cc of viscous liquid had formed in the bottom of the flask. Prior calculations predicted formation of about 0.95 cc of 50% liquid sodium hydroxide in a total reaction time of about 16 hours (0.09 cc/1.5 hr).

Example 2

FIG. 1 is a process flow schematic showing a typical arrangement for reacting sodium in a railway tankcar to sodium hydroxide. The process conditions in this example are calculated. This is not an actual data example.

The tankcar is a typical 12,000 gal car (85" ID and 39' length) having a 17,000 sodium heel with an average 3.6 inch thickness. Nitrogen is fed to a packed bed demister where it is increased in relative humidity. The humid nitrogen is then fed to the tank car where it condenses out water that reacts with the sodium heel inside the tankcar. The nitrogen (and produced hydrogen) then exits the tankcar through the stack, where the hydrogen level is maintained below the lower explosive limit (LEL). The temperature of the tankcar is maintained by the oil system and the oil jacket on the tankcar.

To react 1 lb Na/hr into 53 wt % caustic, requires about 600 acfm $N_2$ at 111° F., saturated. About 2.326 lb/min of water is condensed producing about 0.27 gpm of 53 wt % caustic. The $N_2$ residence time is about 2.67 minutes. Approximately 200,000 BTU/hr is developed and dissapated. The condensation driving force ranges from 36° F. to 39° F. $\Delta T$. The 17,000 lbs of caustic is reacted in about 12 days.

I claim:

1. A method for conversion inside a container having surfaces suitable for condensing, of a reactive metal material into a hydroxide of the reactive metal material, wherein the reactive metal material comprises sodium, the method comprises the steps of:

(a) purging the container of essentially all oxygen with an essentially dry gas that is inert with respect to the reactive metal material; and (b) introducing into the container a water-containing carrier gas, wherein the humidity of the carrier gas, the temperature of the reactive metal material, the temperature of condensing surfaces in the container and the temperature of the carrier gas are all sufficient to condense water out of the carrier gas and onto the reactive metal material thereby forming a hydroxide of the reactive metal material and hydrogen, as the carrier gas contacts the condensing surfaces and the reactive metal material.

2. The process of claim 1 wherein the relative humidity of the carrier gas is in the range of about 50 percent to about 100 percent.

3. The process of claim 1 wherein the temperature of the carrier gas is in the range of about 0° C. to about 100° C.

4. The process of claim 1 wherein the purge gas is selected from the group consisting of nitrogen, neon, argon and helium.

5. The process of claim 4 wherein the purge gas is nitrogen.

6. The process of claim 1 wherein the carrier gas is selected from the group consisting of nitrogen, neon, argon and helium.

7. The process of claim 6 wherein the carrier gas is nitrogen.

8. The process of claim 1 wherein the container is a tank.

9. The method of claim 1 further comprising:

(c) removing any heat generated in step (b).

10. The method of claim 1 wherein the temperature of the carrier gas introduced in step (a) is in the range of about 0° C. to about 100° C., with the temperature of the condensing surfaces being in the range of 5° C. to about 95° C. cooler than the temperature of the carrier gas.

11. The method of claim 10 wherein the temperature of the carrier gas is in the range of about 30° C. to about 60° C.

12. The method of claim 1 wherein the relative humidity of the carrier gas is less than about 50 percent.

13. A method for conversion inside a container having surfaces suitable for condensing and having an essentially dry, essentially oxygen free atmosphere, of a reactive metal material into a hydroxide of the reactive metal material, wherein the reactive metal material comprises sodium, the method comprises the steps of:

(a) introducing into the container a water-containing carrier gas, wherein the humidity of the carrier gas, the temperature of the reactive metal material, the temperature of the condensing surfaces in the container and the temperature of the the temperature of the carrier gas are all sufficient to condense water out of the carrier gas and onto the reactive metal material thereby forming a hydroxide of the reactive metal material and hydrogen, as the carrier gas contacts the condensing surfaces and the reactive metal material.

14. The process of claim 13 wherein the relative humidity of the carrier gas is in the range of about 50 percent to about 100 percent.

15. The process of claim 13 wherein the temperature of the carrier gas is in the range of about 0° C. to about 100° C.

16. The process of claim 13 wherein the carrier gas is selected from the group consisting of nitrogen, neon, argon and helium.

17. The process of claim 16 wherein the carrier gas is nitrogen.

18. The process of claim 13 wherein the container is a tank.

19. The method of claim 13 further comprising:

(b) removing any heat generated in step (a).

20. The method of claim 13 wherein the temperature of the carrier gas introduced in step (a) is in the range of about 0° C. to about 100° C., with the temperature of the condensing surfaces being in the range of 5° C. to about 95° C. cooler than the temperature of the carrier gas.

21. The method of claim 13 wherein the temperature of the carrier gas is in the range of about 30° C. to about 60° C.

22. The method of claim 13 wherein the relative humidity of the carrier gas is less than about 50 percent.

23. A method for conversion inside a container having surfaces suitable for condensing and having an essentially dry, essentially oxygen free atmosphere, of a reactive metal material into a hydroxide of the reactive metal material, wherein the reactive metal material comprises sodium, the method comprises the steps of:

(a) introducing into the container a water-containing carrier gas, wherein the humidity of the carrier gas, the temperature of the reactive metal material, the temperature of the condensing surfaces in the container, and the temperature of the carrier gas are all sufficient to condense water out of the carrier gas and onto the reactive metal material in an exothermic reaction thereby forming a hyroxide of the reactive metal material and hydrogen, as the carrier gas contacts the condensing surfaces and the reactive metal material;

(b) removing exothermic heat of the water-reactive metal reaction of step (a).

24. The method of claim 23 wherein the temperature of the carrier gas introduced an step (a) is in the range of about 0° C. to about 100° C., with the temperature of the condensing surfaces being in the range of 5° C. to about 95° C. cooler than the temperature of the carrier gas.

25. The method of claim 23 wherein the temperature of the carrier gas is in the range of about 30° C. to about 60° C.

26. The method of claim 23 wherein the relative humidity of the carrier gas is less than about 50 percent.

27. A method for conversion inside a container having surfaces suitable for condensing, of a reactive metal material into a hydroxide of the reactive metal material, wherein the reactive metal material comprises sodium, the method comprises the steps of:

(a) purging the container of essentially all oxygen with an essentially dry gas that is inert with respect to the reactive material;

(b) introducing into the container a water-containing carrier gas, wherein the humidity of the carrier gas, the temperature of the reactive metal material, the temperature of condensing surfaces in the container and the temperature of the carrier gas are all sufficient to condense water out of the carrier gas and react with the reactive metal material thereby forming a hydroxide of the reactive metal material and hydrogen, as the carrier gas contacts the condensing surfaces and the reactive metal material; and (c) removing the metal hydroxide formed in step (b) to prevent the metal hydroxide from covering the reactive metal material and slowing the reaction of the reactive metal material with the water condensed in step (b).

28. A method for conversion inside a container having surfaces suitable for condensing and having an essentially dry, essentially oxygen free atmosphere, of a reactive metal material into a hydroxide of the reactive metal material, wherein the reactive metal material comprises sodium, the method comprises the steps of:

(a) introducing into the container a water-containing carrier gas, wherein the humidity of the carrier gas, the temperature of the reactive metal material, the temperature of condensing surfaces in the container and the temperature of the carrier gas are all sufficient to condense water out of the carrier gas and react with the reactive metal material thereby forming a hydroxide of the reactive metal material and hydrogen, as the carrier gas contacts the condensing surfaces and the reactive material; and (b) removing the metal hydroxide formed in step (a) to prevent the metal hydroxide from covering the reactive metal material and slowing the reaction of the reactive metal material with the water condensed in step (a).

29. A method for conversion inside a container having surfaces suitable for condensing and having an essentially dry, essentially oxygen free atmosphere, of a reactive metal material into its respective metal hydroxide, wherein the metal material comprises sodium, the method comprises the steps of:

(a) introducing into the container a water-containing carrier gas, wherein the humidity of the carrier gas, the temperature of the reactive metal material, the temperature of the condensing surfaces in the container and the temperature of the carrier gas are all sufficient to condense water out of the carrier gas and react with the reactive metal material in an exothermic reaction thereby forming a hyroxide of the reactive metal material and hydrogen, as the carrier gas contacts the condensing surfaces and the reactive metal material;

(b) removing exothermic heat of the water-reactive metal reaction of step (a); and (c) removing the metal hydroxide formed in step (a) to prevent the metal hydroxide from covering the reactive metal material and slowing the reaction of the reactive metal material with the water condensed in step (a).

* * * * *